Aug. 13, 1968  H. H. LANDENBERGER  3,397,009
TARP ROLLER

Filed Sept. 29, 1966  2 Sheets-Sheet 1

INVENTOR.
HILBERT H. LANDENBERGER
BY
Victor J. Evans & Co.
ATTORNEYS

Aug. 13, 1968     H. H. LANDENBERGER     3,397,009
TARP ROLLER
Filed Sept. 29, 1966     2 Sheets-Sheet 2
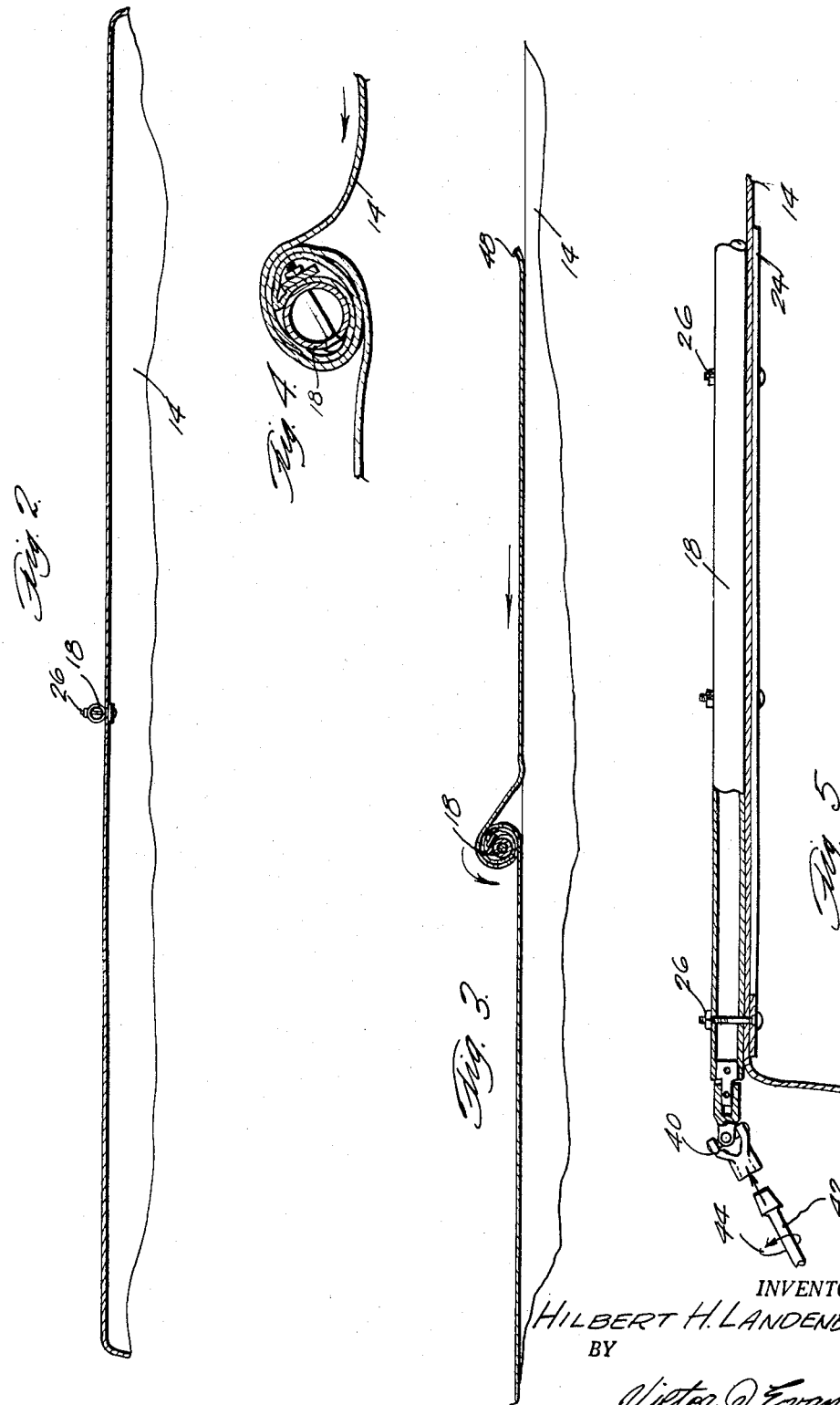
INVENTOR.
HILBERT H. LANDENBERGER
BY
Victor J. Evans Co.
ATTORNEYS 3,397,009
TARP ROLLER
Hilbert H. Landenberger, Rte. 1,
Underwood, N. Dak. 58576
Filed Sept. 29, 1966, Ser. No. 583,040
2 Claims. (Cl. 296—100)

ABSTRACT OF THE DISCLOSURE

A tarp roller apparatus in which there is a roller attached to the tarp at the middle and which will travel with the tarp as the same is rolled for completely enrolling the tarp and when completely rolled the entire top of the truck or wagon box is clear of the tarpaulin.

---

The present invention relates to a tarp roller apparatus and more particularly the invention is directed to a construction in which there is a roller attached to the tarp at the middle thereof and which will travel with the tarp as the same is rolled, and when completely rolled the entire top of the truck or wagon box is clear for loading or unloading.

The tarp roller assembly is bolted on in the middle of the tarp and mounted from the top of the truck or wagon box. The tarp is tied down in the front of the truck box. Then the crank is attached to the roller mounted across the mid portion of the tarp and then the crank is turned. As the tarp rolls over the front half, it pulls the back half of the tarp and rolls it up at the same time. The loose ends are then tied down on the box and it will ride on the box. If it is then desired to unroll the tarp, the sides are loosened and the ends are taken from the tarp and pulled over the load. The ends are then tied so that the tarp is tied down on the side again.

It is an object of the invention to provide a tarp roller assembly that is operable by one man alone and in a few seconds to roll and unroll a tarp by means of the assembly of the invention.

The above and other objects and advantages of the invention will become apparent upon full consideration of the following detailed description and accompanying drawings in which:

FIGURE 2 shows a cross-sectional view taken along lines 2—2 of FIG. 1 showing a portion in detail of the tarp and its roller assembly;

FIGURE 3 shows the manner in which the assembly is used to partially roll up the tarp by means of the roller assembly;

FIGURE 4 shows in detail the roller assembly used conjunctively with the tarp showing in cross-section the manner in which the tarp is rolled upon the roller assembly; and FIGURE 5 shows the tarp roller assembly shown partially in cross-section for being secured to the tarp and the manner in which the crank arm is connected by a universal joint to the roller assembly.

Figure 1:
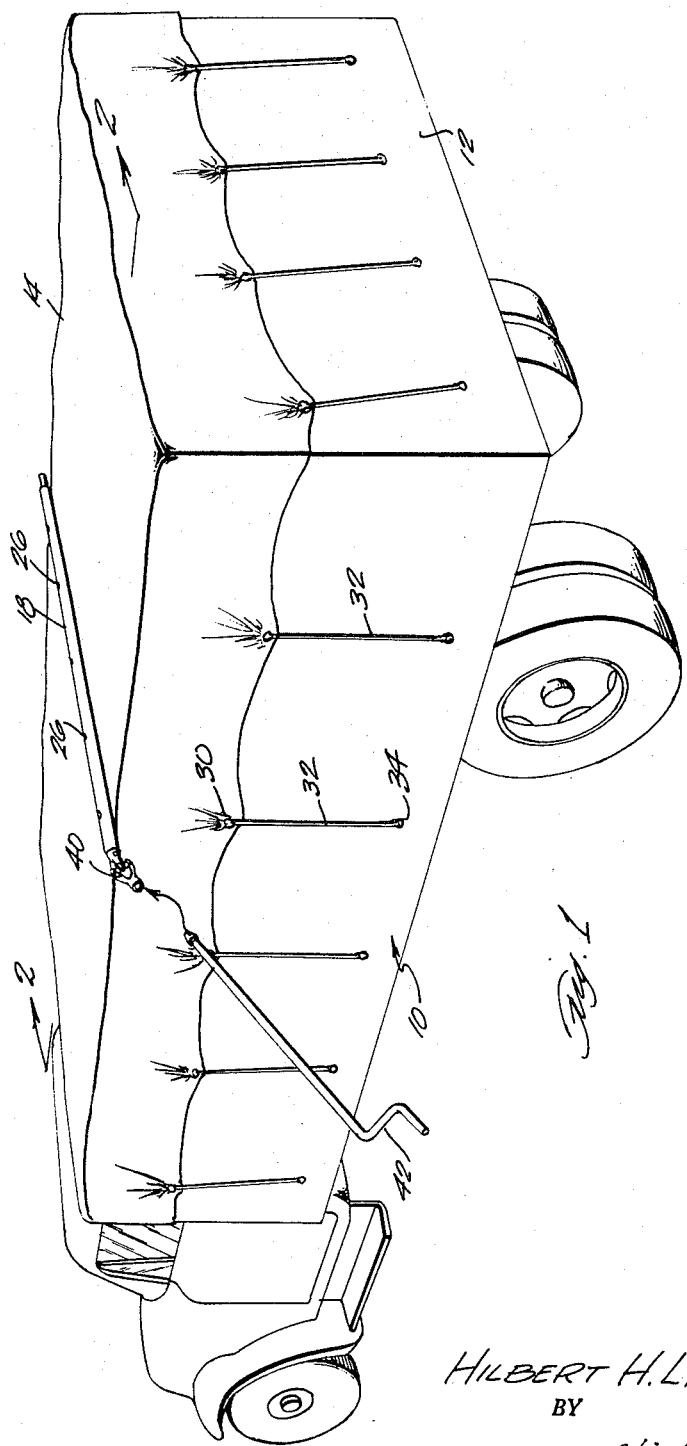
FIGURE 1 shows an isometric or perspective view of the tarp roller assembly mounted on a truck box in accordance with the preferred embodiment of the invention.

Referring now to the drawings, there is shown a truck 10 having a truck box 12 over which there is provided in overlying relation a tarpaulin or tarp 14. Centrally disposed and transversely arranged with respect to the truck box 12 is a roller 18 which is positioned upon the tarp 14. In substantial alignment with the length dimension of the roller 18 and under the tarp 14 there is positioned a metal or plastic strap 24 which is connected to the roller 18 by bolts 26, 26.

It is seen that the strap 24 may be made of iron or like metal, and that the length dimension of the roller 18 is substantially less than the colinear dimension of the tarp which is positioned proximate thereto.

There are spatially disposed throughout the periphery of the tarp 14 a series of eyelets 30 to which lengths of a line or other securing means 32 may be secured having their other ends secured by hooks 34 to the truck box.

When it is desired to roll the tarp 14 into a retrieved position, the hooks 34 are uncoupled from the truck box 12 and the roller 18, being coupled by a universal joint 40 to a crank arm 42, is turned by the crank arm 42 so that the roller causes the tarp 14 to roll up thereon as is shown in FIGS. 3 and 4. In this way, the tarp 14 is rolled up on the roller until substantially all of the tarp 14 on the roller 18 is gathered at the forward end of the truck box, as would be shown in FIG. 3. This is accomplished by turning the crank arm 42 in the direction shown by the arrow 44 in FIG. 5.

When it is desired to unroll the tarp from the roller, the aft end 48 of the tarp may then be pulled along the truck box 12 until the rolled tarp is fully extended and the roller 18 is in condition as shown in FIG. 1. At that point, the hooks 34 on lines 32 may then be mounted and engaged to the truck box as shown in FIG. 1.

Additional embodiments of the invention in this specification will occur to others and therefore it is intended that the scope of the invention be limited only by the appended claims and not by the embodiment described hereinabove. Accordingly, reference should be made to the following claims in determining the full scope of the invention.

What is claimed is:

1. A truck tarp roller assembly comprising a centrally disposed roller positioned transversely upon the edges of a truck box, a tarp interposed between said edges of said truck box and said roller, the proximate portion of said tarp being secured to said roller by a strap bolted to said roller, said tarp being interpositioned between the roller and the strap, one end of said roller having a universal joint coupled thereto, said universal joint adapted to receive a crank arm for turning the roller in rolling up the tarp upon the roller, the transverse dimension of the tarp proximate to the roller and generally colinear therewith to the length of the roller being greater than the length of the roller.

2. The invention according to claim 1 wherein hooks are spatially provided from lines connected about the periphery of the tarp to be secured to said truck box.

References Cited

UNITED STATES PATENTS

| 3,298,732 | 1/1967 | Openshaw | 296—100 |
| 2,969,284 | 1/1961 | Ambli | 296—100 |
| 2,811,321 | 10/1957 | Barre | 296—98 X |
| 3,306,344 | 2/1967 | Youngs | 160—241 |
| 1,712,455 | 5/1929 | Connolly | 160—309 |

PHILIP GOODMAN, *Primary Examiner.*